United States Patent [19]

Hellekson et al.

[11] Patent Number: 4,709,195

[45] Date of Patent: Nov. 24, 1987

[54] BAR CODE SCANNER WITH DC BRUSHLESS MOTOR

[75] Inventors: Ronald A. Hellekson, Eugene; Donald S. Peterson, Philomath, both of Oreg.

[73] Assignee: Spectra-Physics, Inc., San Jose, Calif.

[21] Appl. No.: 907,293

[22] Filed: Sep. 12, 1986

[51] Int. Cl.$^4$ ............................................. H02K 29/08
[52] U.S. Cl. ...................................................... 318/254
[58] Field of Search ............... 318/138, 254, 430, 431, 318/434, 439

[56] References Cited

U.S. PATENT DOCUMENTS 4,429,262  1/1984  Utenick ............................ 318/627 X
4,541,029  9/1985  Ohyama ............................ 318/430 X

*Primary Examiner*—Bentsu Ro
*Attorney, Agent, or Firm*—Donald C. Feix; T. M. Freiburger; Paul Davis

[57] ABSTRACT

A laser scanner having a rotating mirror, such as a POS scanner as used in supermarkets, uses a closed-loop velocity controlled DC brushless motor for rotating the mirror. In addition to providing a hall effect motor speed signal which is used for monitoring and safety features in association with the scanner, the DC brushless motor provides the advantages of greatly reduced power consumption, decreased temperature rise, less electrical noise in the analog scanner circuitry, reduced cost, and greatly reduced size, sometimes over 80%. The use of the inherent motor speed signal from the DC brushless motor also enables elimination of costly mechanical windswitches as typically used in prior scanners.

9 Claims, 7 Drawing Figures

BAR CODE SCANNER WITH DC BRUSHLESS MOTOR

BACKGROUND OF THE INVENTION

The invention relates to bar code scanning devices and particularly to those scanners utilizing a rotating mirror. The invention adapts a DC brushless motor for use in rotating a mirror of a scanner, with a number of attendant advantages.

In the prior art, laser scanners, particularly POS (point of sale) retail scanners, have used AC synchronous shaded pole type motors for driving a rotating element such as a multifacated rotating polygon mirror. Typically these 60-cycle synchronous motors were inefficient and generated a considerable amount of heat. This was often deleterious to the rotor bearings and the motor spindle, which were sometimes the first components to wear out in such prior scanners.

A safety requirement for laser scanning devices is that the laser beam must not be operative when the scanner motor is stopped, or rotating below a certain speed which will assure that retina exposure will be of sufficiently short duration to be safe for persons positioned nearby. Thus, if a scanner motor failed or was below speed, the safety requirement has been that the laser beam must be immediately shut off.

In the prior art, this requirement typically was met through the use of a windswitch, i.e. a mechanical switch with a wind-operated flap which would keep the windswitch in the "on" position only so long as wind or air movement generated by the laser scanner motor (with wind-producing blades) was at or above a minimum speed. In addition to the difficulty in precisely defining such a minimum speed with these relatively crude, spring-loaded wind switches, they were also relatively costly and took up space in the laser scanner.

Laser scanner motors and associated circuitry of the prior art have not had the advantages of efficiency, low temperature rise, low noise, reliability and simplicity of components, and reduced space requirements as in the present invention described below.

SUMMARY OF THE INVENTION

In accordance with the present invention, a closed-loop velocity controlled DC brushless motor is adapted for use in a laser scanner of the type having a motor-driven rotating scanning element such as a polygon mirror or holographic disk.

As is well known, in a DC brushless motor the rotor needs no electrical connection. It carries permanent magnets. Cooperating electromagnets, whose polarity is reversed repeatedly to drive the motor, are contained in a stationary armature. Power transistors, typically mounted on a stationary printed circuit board adjacent to the rotor, are timed to change the polarity of the electromagnets in the proper timing sequence to drive the motor at the desired speed.

For sensing of the speed and position of the rotor of the DC brushless motor, hall effect devices are positioned stationarily adjacent to the rotor, i.e. adjacent to the path of permanent magnets carried on the rotor. These devices feed a signal ultimately to the power transistors, for correct timing of power pulses to the electromagnets. Logic associated with the printed circuit board receives the hall output from the hall effect devices and processes these signals to turn on the correct power switch at the correct time.

Typically, desired speed is maintained in such DC brushless motors via a current detected through a resistor when the motor is up to speed. The power transistors switch power to the electromagnets on and off at the right rate to maintain proper motor speed. If the motor overspeeds, the current is limited by turning power off at all the power transistors; and if the motor is underspeed, power is again supplied.

Such a DC brushless motor for use with the system of the present invention may comprise, for example a Synektron Model 103040 in modified form. This is a motor of the general type previously used on disk drives and some VCRs, wherein the motor is typically operated at about 3600 RPM. Such a motor, as described above, is a closed-loop velocity controlled DC brushless motor, and such a motor includes hall effect sensors or switches for the driving of the motor and for the velocity control function. With the present invention the motor may be operated at 6000 RPM, through somewhat modified motor control circuitry.

In accordance with the present invention such a DC brushless motor is adapted for use with a laser scanner including a rotating polygon mirror. The hall effect switch or switches typically included with such a motor are adapted in accordance with the invention for other uses—monitoring of motor speed, as to underspeed and overspeed conditions, for meeting safety requirements.

Thus, if the motor is stopped or rotating below a permissible range of operating speed, there could potentially be a threat of retina damage to persons encountering the laser beam of the scanner, since the scanning beam is not moving as fast as it is supposed to be. Under such a condition the system of the invention generates a signal which is used by other associated circuitry to shut down power to the laser.

In addition, the invention utilizes the hall effect signal in the event of an overspeed condition in the DC brushless motor. Such a condition could cause damage to components of the scanning device, particularly the rotating polygon mirror, so that it is desirable to shut down the motor and also the laser, since the motor is being shut down. To this end, the sensing circuitry in accordance with the invention provides a second output signal which will indicate both the underspeed condition and the overspeed condition, to be fed into the associated circuitry for shutting down the laser or for shutting down both the laser and the motor.

Another feature of the invention is that the motor sensing circuitry can receive a separate signal from a microprocessor associated with the laser scanner, to shut down the motor in the event the sequence of startup of the motor is not in accordance with the prescribed sequence. The signal from the microprocessor is generated when, for example, the motor has not come up to speed, as signaled by the output signal described above (fed to the microprocessor), within a selected period of time, such as about 10 to 20 seconds. In that event the laser will not be turned on.

In accordance with the invention, the output signal from one of the hall effect switches of the motor is used as an input to motor detector circuitry of the invention. The motor detector circuitry receives a pulse train signal from the hall effect switch, derives a voltage proportional to frequency (i.e. speed of the motor), compares the derived voltage to a reference voltage representative of a minimum permissible operating speed, and outputs a voltage signal which indicates either up to speed, i.e. within a permissible speed range, or not up to speed.

This signal or signals is then used for safety and other control functions as described above.

The scanner motor and associated motor detector circuitry in accordance with the invention provide a number of important advantages. As compared with some previous prior art scanners utilizing a 60-cycle AC synchronous shaded pole type motor, power consumption of the motor of this invention can be about 90% less, in the range of about 7 to 8 watts. Motor temperature rise is cut severely, up to about 90% in comparison with such prior art assemblies. Spindle and bearing life are extended due to cooler operation. The size requirement for the motor is reduced, sometimes over 80%. The windswitch assembly, as described above, is eliminated via the use of the DC brushless motor of the present invention, since the hall effect signal is processed to provide safety control signals for shutting off the laser in underspeed conditions. In addition, the system of the invention generates less electrical noise in the analog section of the circuitry due to the low power consumption and low voltages of the DC brushless motor. Cost is reduced in several respects, through reduced cost of the motor components themselves, lower power requirements, and elimination of the windswitch assembly.

It is therefore among the objects of the invention to adapt a DC brushless motor for use in a laser scanner of the type having a rotating polygon mirror, increasing efficiency and reliability and providing important additional advantages over the prior art.

Other and further objects of the present invention will be apparent from the following description and claims and are illustrated in the accompanying drawings which, by way of illustration, show preferred embodiments of the present invention and the principles thereof and what are not considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF PREFERRED EMBODIMENT

Figure 1:
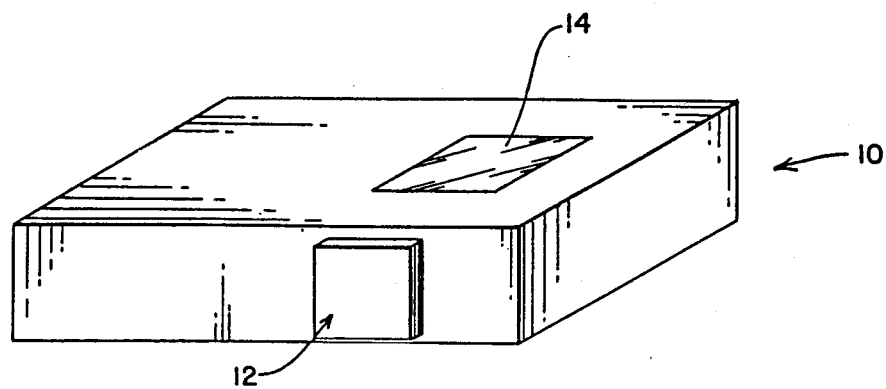
FIG. 1 is a perspective view generally indicating a laser scanner incorporating a DC brushless motor, in accordance with the invention.

In the drawings, FIG. 1 shows a laser bar code scanner 10 of the type to which this invention relates. The scanner 10 typically is a POS type scanner for use in retain stores, utilizing a rotating element for rotating one or more mirrors or a holographic disk to generate multiple-apparent-source scan geometry. For example, the scanner may have a multi-faceted rotating polygon mirror and may be as described in copending application Ser. No. 907,292, filed Sept. 12, 1986 and assigned to the same assignee as the present invention. Also, it may incorporate laser power supply circuitry as disclosed in copending application Ser. No. 907,291, filed Sept. 12, 1986 and also assigned to the same assignee.

In accordance with the invention the scanner 10 adapts and incorporates a DC brushless motor, generally indicated at 12 in FIG. 1 but represented only as a back casing, to rotate a scanning element such as a multi-faceted polygon mirror. The polygon mirror reflects a light beam through beam routing optics to generate scanning fans which ultimately emerge from the scanner through a scan window 14 to form scan lines from multiple apparent sources, as described, for example, in the above-referenced copending application.

Figure 2:
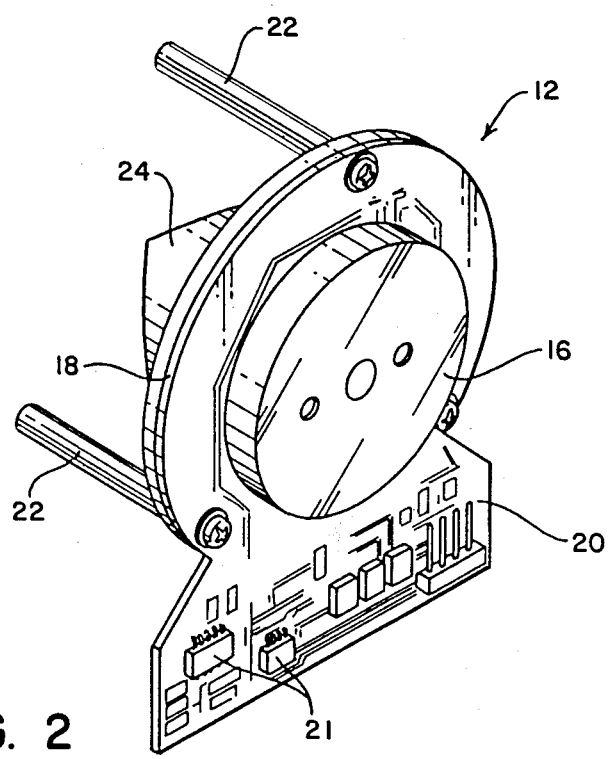
FIG. 2 is a perspective view of a DC brushless motor which may be used with the invention, with a PC board with motor drive/control circuitry.

FIG. 2 shows the DC brushless motor 12 in a form useable with the invention. The motor 12 has a rotor 16 rotationally mounted on a base 18, which has a printed circuit portion 20 below the rotor with motor control circuitry generally indicated at 21. Mounting devices 22 may extend from the base 18. Fixed to the rotor and extending into the scanner is indicated a polygon mirror support 24. This could be another type of rotational scanning element.

Figures 1, 3:
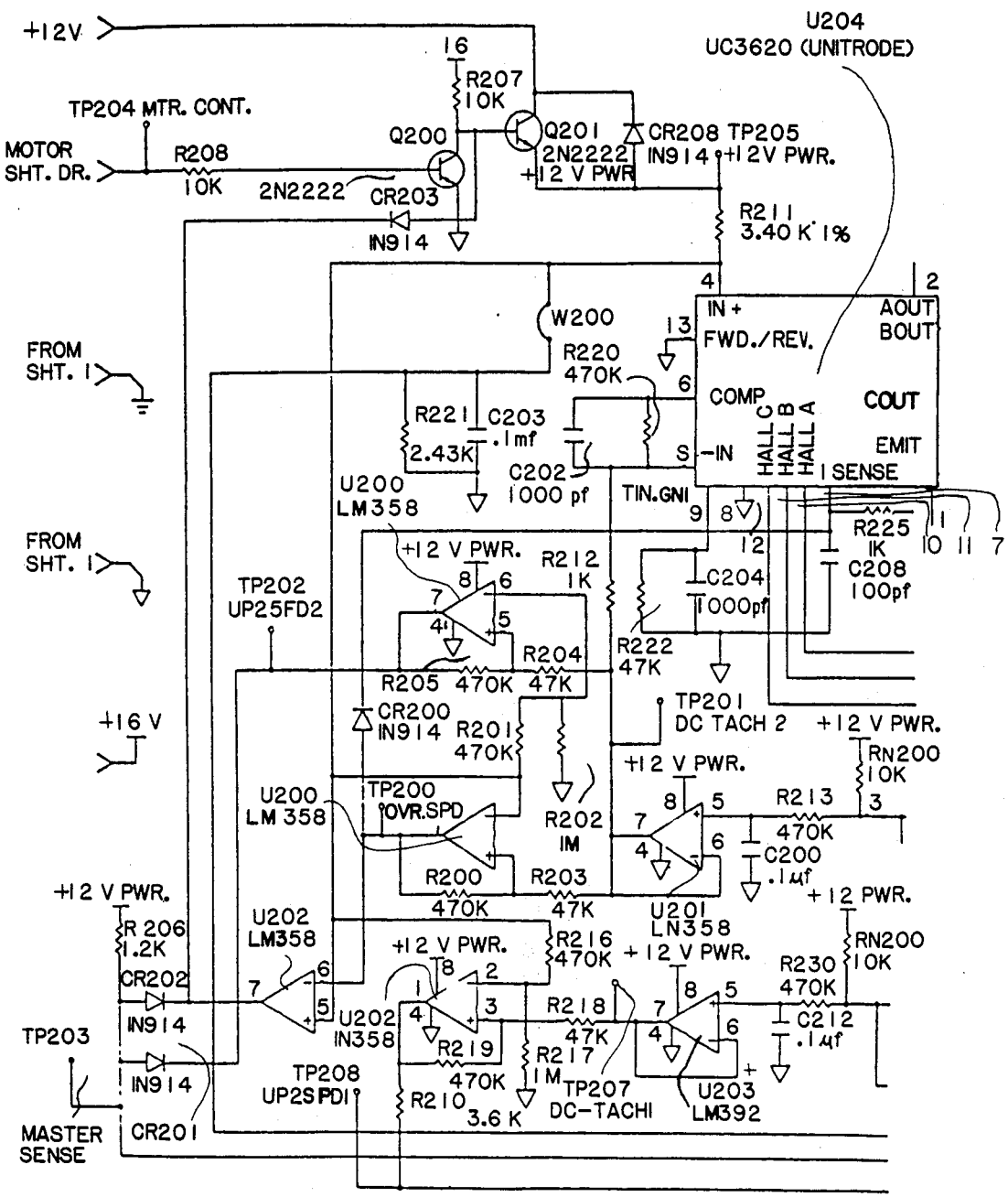
FIG. 3 is a schematic circuit diagram showing an example of the motor drive/control circuitry.
Figures 2, 3:
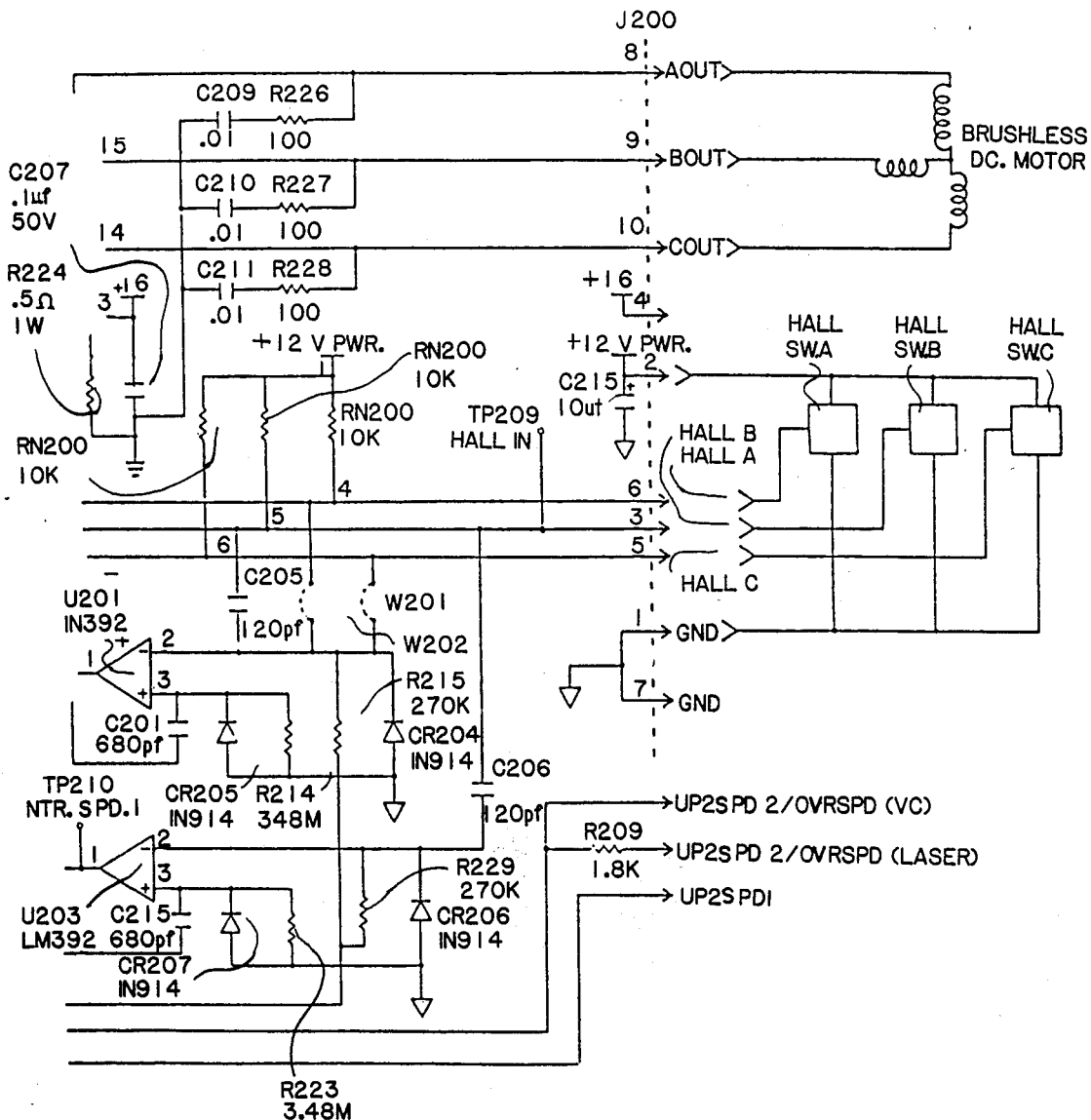

FIG. 3 shows one example of motor drive circuitry which may comprise the circuitry 21 indicated in FIG. 2.

Figures 1, 4:
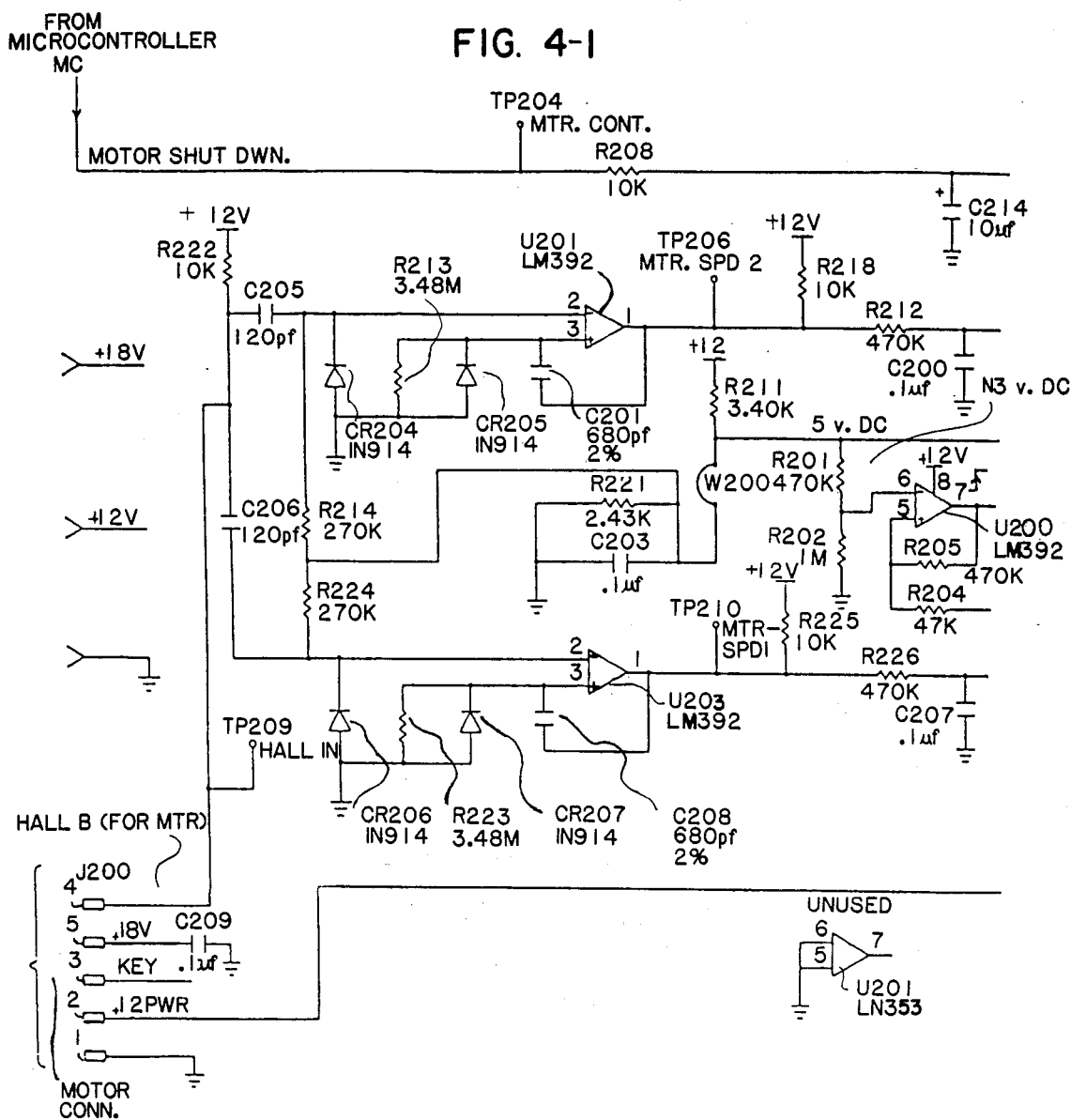
FIG. 4 is a schematic circuit diagram showing motor sensing and control circuitry in accordance with the invention, for receiving a hall effect signal from the motor and outputting signals representing underspeed and overspeed conditions.
Figures 2, 4:
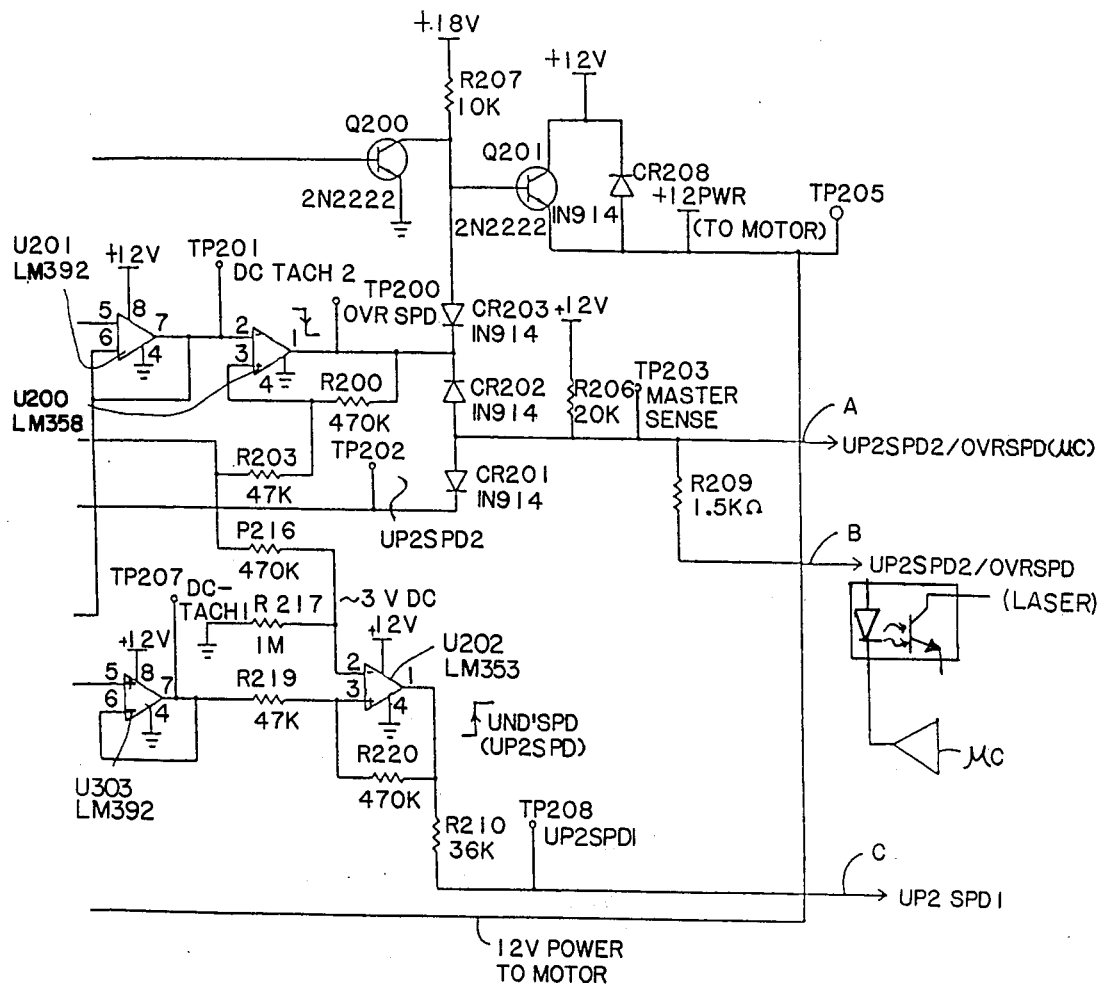

FIG. 4 is a schematic diagram showing motor sensor circuitry for receiving one of the hall effect signals from the motor drive circuitry exemplified in FIG. 3.

As outlined above, the motor sensor circuitry is used to detect if the motor is going the correct speed and to shut the laser off if the motor is out of specification. The circuitry operates off one of the hall effects which output from the motor. The "HALL B" output is shown as an input at J200 in FIG. 4, pin 4. The J200 pin 4 comes into the circuit board at test point 209 (TP209) and is connected to two identical circuits that comprise a one-shot circuit.

The HALL B is AC coupled to the one-shot circit via C205 in the first circuit and via C206 in the other circuit, on the falling edge of the HALL B signal. The one-shot is composed of a comparator U201 in one circuit and a comparator U203 in the other circuit. The comparator output goes high for a time period determined by C201, R213 in the one circuit and by C208, R223 in the other circuit. This means that the hall switch pulse train is converted to a train of pulses of known pulsewidth. These pulses can then be filtered by R212, C200 in one circuit and R226 and C207 in the other circuit.

That filters the train of pulses, producing a voltage that is proportional to speed at pin 5 of U201 in the first circuit and of U203 in the second circuit. U201 and U203 pin 7 is a buffered representation of that voltage. Then U200 in the first circuit, U202 in the second circuit compare this speed-proportional voltage to a reference voltage. U200 contains two amplifiers, both of which are used: U200 pins 1, 2 and 3 are used to detect the overspeed condition and U200 pins 5, 6 and 7 are used to detect the underspeed condition.

The reference voltage is derived from the +12. A +5 volt reference voltage is derived from the +12 via resistive divider R211, R221 and then is connected into the three comparator circuits indicated. Each comparator has positive feedback to give some hysteresis to give a clean detection of the correct or incorrect condition without oscillations at the transition.

Thus, 5 volts DC is at the point between R211 and R221, as indicated in FIG. 4. Then the 5 volts is further divided down, to roughly 3 volts AC at U200 pin 6 and it is also roughly 3 volts at U202 pin 2 (both being minus inputs to the amplifier), with these two comprising the undervoltage detector.

Thus, when the voltage proportional to speed rises above this roughly 3 volts, then the comparator output goes high, giving a positive edge at the outputs U202 pin 1 and U200 pin 7, indicating that the motor has reached a safe speed which may be approximately 3500 to 4000 RPM, and that it is safe to turn the laser on.

The 5 volt reference voltage is connected to U200 pin 3, the overspeed detector, through R203 as shown in the drawing. R200 and R203 make up a positive feedback network that sets the overspeed threshold and gives some hysteresis to the switching to provide a clean transition. When the voltage on U201 pin 7 rises above approximately 5.5 volts (indicating that the motor is going 600-800 RPM above the normal speed), then U200 pin 1 will go low (indicating an overspeed condition). When U200 pin 1 goes low, the 12 volt control voltage is removed from the motor so that it stops, and a logic signal simultaneously goes to the microcontroller so it can shut the laser off, as indicated at the right of the drawing by UP2SPD-2/OVRSPD(μC), at output line A.

The underspeed (UP2SPD2) signal will also go to the microcontroller so it can shut the laser down in the underspeed condition, as a redundancy for safety requirements.

The output line B indicated in the drawing also signals UP2SPD2/OVRSPD but rather than going to the microcontroller, it goes to an opto-coupled isolator on the laser power supply and shuts down the laser directly. (such connected power supply circuitry is shown in above-referenced application Ser. No 907,291.

A resistor R209 limits the current into the opto-coupler, which has a photodiode.

The signal at the opto-coupler can also be sent to the microcontroler as indicated in the drawing, and the motor can be shut down by a logic signal (MOTOR SHUT DWN) indicated at the upper left of the drawing as coming from the microcontroller. That will shut down the motor the same way as the overspeed does, buy turning off the 12 volt current going to the motor control circuitry, and this will be based on sensing of an improper sequence of startup, as determined by the microcontroller monitoring the up-to-speed signal. The microcontroller monitors the up-to-speed signal, and if it indicates the motor has not come up to speed within some reasonable period of time, then it assumes that the motor has stalled and shuts it down to avoid overheating. The motor will also be shut down if the controller indicates it did not start up in the proper sequence.

The outuput line C in the drawing is an up-to-speed signal alone (underspeed), used to shut down the laser in the underspeed condition, in double redundancy with the outputs A and B.

Figure 5:
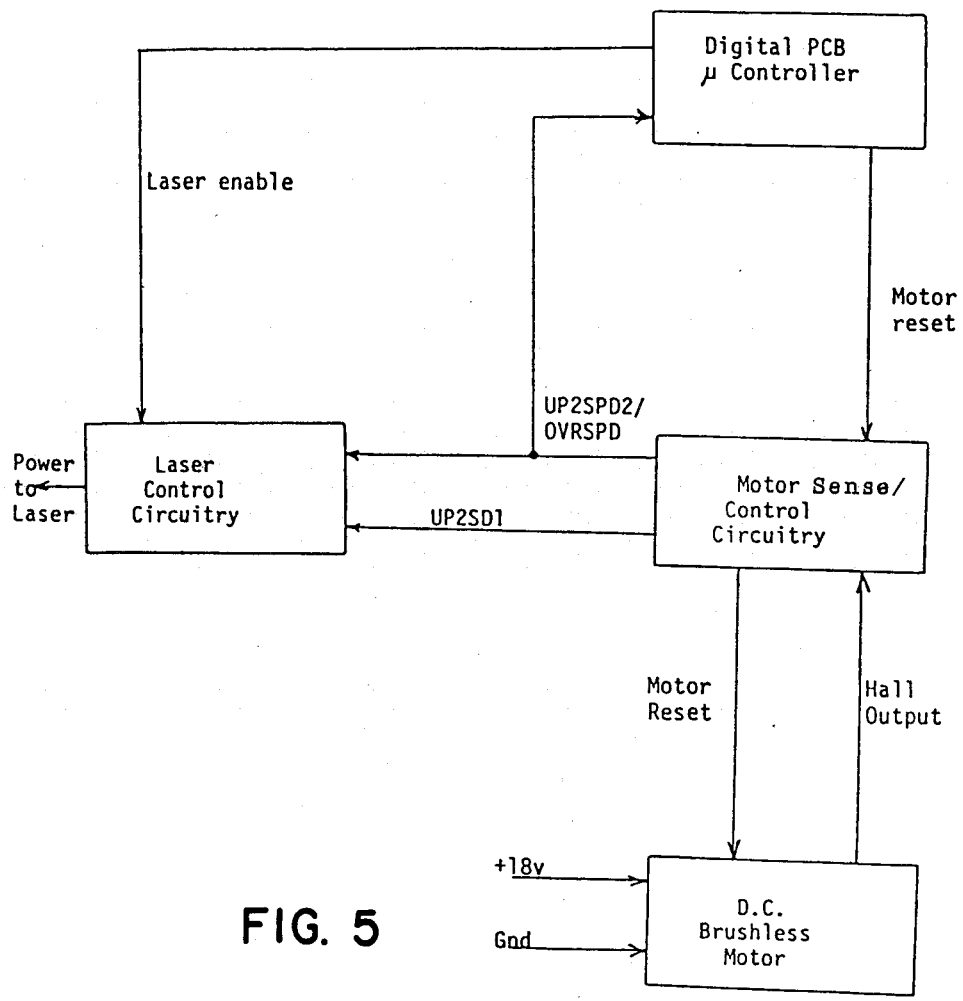
FIG. 5 is a block diagram indicating a safety interlock system associated with the circuitry shown in FIG. 4, for shutting off the laser and/or the motor in underspeed and overspeed conditions and if start-up sequence is not as prescribed.

FIG. 5 indicates in block diagram from the safety interlock features described above, further illustrating the functional interconnection between the DC brushless motor, the motor sense/control circuitry shown in FIG. 4, the microcontroller, and laser control circuitry such as disclosed, for example, in copending application Ser. No. 907,291, filed Sept. 12, 1986 and referenced above.

As illustrated in FIG. 5, the motor sense/control circuitry generates the up-to-speed and overspeed signals and also allows the microprocessor to shut down the +12 volt power to the motor, thus stopping or resetting the motor.

As outlined above, both UP2SPD1 and UP2SPD-2/OVRSPD circuits are completely separate and ultimately redundant.

As also mentioned above, the laser control circuitry may consist of three optically isolated control switches. Two of the switches disable the entire laser supply when activated. Both of these switches are enabled and disabled by the UP2SPD1 and UP2SPD2/OVRSPD signals, which, again are separate and redundant. The third opto-isolator is enabled/disabled by the microcontroller. This third switch shuts the laser control IC down by shunting the start control pin to ground, effectively shutting down all power to a controlled power MOS-FET switch of the control circuitry.

The microcontroller, indicated as being on a digital printed circuit board, continually monitors the UP2SPD2/OVRSPD signal and either enables or disables the laser and/or motor, depending upon the level and sequence of the UP2SPD2/OVRSPD signal.

The laser safety interlock feature indicated in FIG. 5 thus has two major junctions: (1) to ensure that a stationary laser beam (or a too-slowly moving laser beam) cannot exit the scanner; and (2) to ensure that an overspeed condition of the motor does not occur.

On normal power-up, the sequence is as follows. Initially upon power-up, the UP2SPD1, UP2SPD-2/OVRSPD and Laser Enable signals are all disabled, ensuring that the laser is off. As the motor reaches the up-to-speed lower trip point, which may be in the range of about 3500 to 4000 RPM, UP2SPD1 and UP2SPD-2/OVRSPD are enabled. Simultaneously the microcontroller verifies that the UP2SPD2/OVRSPD signal has gone through a low to high transition, i.e. the motor has indeed come up to speed and the signal was not just "latched" high. After the microcontroller has verified this transition sequence, it will enable the Laser Enable signal, thus turning on the laser. The scanner is functional at this point.

In the event of a quick power outage or if the scanner is unplugged and re-powered quickly, the microcontroller may not detect a low to high transition of the UP2SPD2/OVRSPD signal because the motor might still be up to speed. If this is the case, the microcontroller will shut the motor off, via the motor reset line indicated, for 5 seconds to allow the motor to glide down to below the up-to-speed comparator threshold level. It will then bring the motor back up to speed and verify and proper transition sequence before enabling the laser.

If during normal operation, the UP2SPD-2/OVRSPD signal goes low, indicating a motor underspeed or overspeed condition, both theo pto-isolator switch and the microcontroller will ensure that the laser is off. If it is a true underspeed condition, UP2SPD1 will also go low, disabling its corresponding opto-isolator switch. In any one fault condition, overspeed or underspeed, a minimum of two of the three laser control switches will be disabled.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a laser scanner including a rotating scanning element, a motor and associated circuitry, the improvement comprising:
    said motor being a DC brushless motor,
    said DC brushless motor connected to the rotating scanning element, the motor being closed-loop velocity controlled and including a hall effect device,
    motor detector circuitry means for receiving a hall effect signal from the hall effect device, and including means for deriving a voltage proportional to frequency of the hall effect signal, means for comparing the derived voltage to a reference voltage representative of a minimum permissible operating speed, means for outputting a voltage signal which indicates either up to speed, i.e. within permissible speed range, or not up to speed, and means for shutting off a laser of the scanner when the motor is not up to speed.

2. The improvement according to claim 1, further including overspeed detection means in the motor detector circuitry means, for outputting a voltage signal indicating overspeed when the motor exceeds its preset normal speed by a predetermined amount.

3. The improvement according to claim 1, wherein the motor detector circuitry means includes a doubly-redundant signal means for outputting three voltage signals representing an underspeed condition, all for use in shutting off the laser of the scanner when the motor is not up to speed.

4. The improvement according to claim 3, wherein two of the three output voltage signals also represent overspeeding of the motor, when the motor exceeds a preset normal speed by a predetermined amount.

5. A method for producing a signal indicating motor speed for use in shutting off a laser for safety purposes in a laser scanner having a motor-driven rotating scanner element, comprising the steps of:
    providing a DC brushless motor connected to drive the rotating scanner element, the motor being closed-loop velocity controlled and including at least one hall effect device,
    receiving a signal from the hall effect device,
    deriving from the signal a voltage proportional to frequency of the signal,
    comparing the derived voltage to a reference voltage representative of a minimum permissible operating speed,
    outputting a voltage signal which indicates either up to speed, i.e., within permissible speed rang,e or not up to speed, and shutting off the laser of the scanner when the motor is not up to speed.

6. The method according to claim 5, further including the step of shutting off the laser if the voltage signal indicates not up to speed.

7. The method according to claim 5, further including the steps of comparing the derived voltage to a second reference voltage representative of maximum permissible operating speed, and outputting a voltage signal indicating overspeed whenever said maximum speed is reached.

8. The method according to claim 7, further including the steps of shutting off the motor and the laser when overspeed is indicated.

9. The method according to claim 7, further including the steps of feeding the up to speed and overspeed output voltage signals to a microcontroller and shutting off the motor if the motor has not started up according to a prescribed startup sequence, as determined by the microcontroller.

* * * * *